United States Patent [19]

Boutevin et al.

[11] Patent Number: 5,753,764
[45] Date of Patent: May 19, 1998

[54] PRODUCT FOR FORMING A COATING ONTO A SUPPORT AND PREPARATION PROCESS OF THIS PRODUCT

[75] Inventors: Bernard Boutevin, Montpellier; Jacques Pouyfaucon, La Barre; Jean-Pierre Parisi, Clapiers, all of France; Jean Schrijnemackers, Embourg, Belgium

[73] Assignee: Recherche Et Developpment Du Groupe Cockerill Sambre, en abrégé, Liège, Belgium

[21] Appl. No.: 535,755

[22] Filed: Sep. 28, 1995

[30] Foreign Application Priority Data

Sep. 28, 1994 [BE] Belgium ............................ 9400881

[51] Int. Cl.$^6$ ............................................. C08F 8/00
[52] U.S. Cl. ................................... 505/287; 428/421
[58] Field of Search ....................................... 525/287

[56] References Cited

FOREIGN PATENT DOCUMENTS 0 175 035 A1   3/1986   European Pat. Off. .

OTHER PUBLICATIONS

Takahishi et al, Poly(vinyl Chloride) Plastisol Coating Materials for Metals, Chemical Abstracts, Abstract No. 46277h, vol. 84, p.122, 1976.

*Primary Examiner*—Bernard Lipman
*Attorney, Agent, or Firm*—Browdy and Neimark

[57] ABSTRACT

A product for forming a coating on a support, in particular a protective coating against corrosion, photonic degradation and/or against gas penetration, comprising a halogenated polymer and/or copolymer activated by at least one peroxide and/or hydroperoxide function to which at least one phosphonated chain is attached.

17 Claims, No Drawings

PRODUCT FOR FORMING A COATING ONTO A SUPPORT AND PREPARATION PROCESS OF THIS PRODUCT

The present invention relates to a product for forming a coating onto a support, in particular a protective coating against corrosion, photonic degradation and/or against gas penetration.

The currently used products for one of the above mentioned applications, in particular in the specific case of anti-corrosion protection, require the use of several different coating products for forming a coating which permits to achieve the protectional objectives altogether. Moreover, these products contain toxic heavy metal derivatives dissolved in very volatile solvents which may also be noxious.

More particularly, the conventional process used nowadays in the anti-corrosion field comprises at least four successive treatment steps, namely : a phosphatation, a chromatation, the application of a primary layer and the application of a finishing layer.

This requires heavy energy consuming material since a supplementary drying and rinsing step has necessarily to be provided between each of said four steps.

Moreover, Chemical Abstracts, vol. 84, No.2, 23/2/1976, Columbus, Ohio, USA ; abstract No. 46277h, p.122 and JP-A-75126749 (Chisso Corp.) Apr. 3, 1974, mention a binder consisting of a polyvinyl chloride plastisol which is physically mixed with polymerizable cross-linkable phosphate-bearing compounds. Furthermore, the mixture is deposited and has to be heated at 200° C. to cause a co-cross-linkage of the whole, in the presence of a free-radical initiator.

The document EP-A-0175035 (Sumitomo) 26/03/1986 concerns a photocross-linkable application, the products contained in the composition being multi-functionnal phosphates. Said composition contains acrylic polymers and unsaturated oligomers. Further, the polymers used do not provide a barrier against humidity and the anti-corrosion protection is only temporary.

One of the objects of the present invention is to propose a product which permits to form in one single step or, in some cases, possibly in two steps a coating showing the properties of anti-corrosion protection, photonic degradation and/or against gas penetration. By its properties, the product according to the invention permits thus to replace the all of the previous four steps by two steps at the most to obtain a coating which will be at least equivalent to the one obtained in four steps. For certain applications, a two-step process can be considered, the first step consisting in forming an anti-corrosion coating according to the invention, but in a thin layer, the second step consisting in depositing the finishing layer, which may be of the same nature or of a different nature than the first layer.

So, the product according to the invention comprises a halogenated polymer and/or copolymer activated by at least one peroxide and/or hydroperoxide function to which at least one phosphonated chain is attached.

Advantageously, the halogenated polymer and/or copolymer is a fluorated or chlorofluorated polymer and/or copolymer, preferably of the thermoplastic type.

According to a particular embodiment of the invention, the halogenated copolymer is of the type of ethylene/tetrafluoroethylene, ethylene/chloro-trifluoroethylene, tetrafluoroethylene/propylene, ethylene/halogenated vinyl ether, vinylidene fluoride/perfluoropropene, tetrafluoroethylene/isobutylene or vinylidene fluoride/perfluoroisobutylene, hexafluoroisobutylene/vinylidene fluoride.

The invention concerns also a process for preparing said product.

This process is characterized by the fact that at least one reactive function of the peroxide and/or hydroperoxide type is created on said halogenated polymer and/or copolymer and that at least one phosphonated chain, in particular a phosphonated monomer, is grafted onto the thus activated polymer and/or copolymer.

Other details and particularities of the invention will become apparent from the following description of several particular embodiments both of the product according to the invention and of the process for preparing this product.

The present invention relates more particularly to a product for forming a coating onto a support, in particular a protective coating against corrosion, photonic degradation and/or against the penetration of certain corrosive gasses.

The product is in particular a product which permits, on the one hand, to create a barrier effect with respect to moisture thanks to the hydrophobic power introduced by certain groups of this product and adheres, on the other hand, very strongly to a metal surface of the support to be coated thanks to the formation of organo-metal compounds with chemical groups which are part of this product and which react easily with this surface.

More concretely, the product according to the invention comprises a halogenated polymer and/or copolymer activated by at least one peroxide and/or hydroxyperoxide function to which at least one phosphonated chain is attached.

According to the invention, it has been found that through the intermediary of the halogenated polymer or copolymer, in particular when it is fluorated, a barrier effect with respect to moisture is obtained thanks to the hydrophobic power introduced by the fluor which reduces the surface tension in an important way.

Moreover, the presence of phosphonated grafts or chains produces both the adhesion of the halogenated polymer or copolymer onto the metal support and, as a result thereof, the anti-corrosion protection by a well known surface phosphatation mechanism. The most important adherence is obtained by phosphonic acid groups which react easily with the surfaces and form all in one organo-metal compounds ensuring a thermodynamically stable behaviour of the coated surface since these compounds are perfectly insoluble.

According to the present invention, the halogenated polymer or copolymer is advantageously chosen amongst the fluorated or chlorofluorated compounds of the thermoplastic type, such as: polyvinylidene fluoride (PVDF) marketed amongst others under the name "Foraflon" or "Kynar", or copolymers of ethylene and tetrafluoroethylene (E/TFE) or ethylene and chlorotrifluoroethylene (E/CTFE) known for example under the denomination "Tefzel" or "Halar".

The halogenated polymer or copolymer can also be chosen amongst the elastomer type compounds, such as copolymers of tetrafluoroethylene and propylene (TFE/$C_3H_6$) marketed under the name "Aflas", of ethylene and perfluorated vinyl ether of the Asahi company ($C_2H_4$/$CF_2$=CF—$OCF_3$), compounds obtained on the basis of vinylidene fluoride and perfluoropropene ($VF_2$/$C_3F_6$) marketed by DuPont (Viton) or Ashi (Dial), copolymers of tetrafluoroethylene and isobutylene (TFE/i-BU) or of hexafluoroisobutylene and vinylidene fluoride:

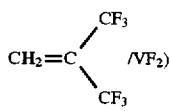

of the Allied Company.

These halogenated polymers or copolymers constitute the skeleton which render the coating hydrophobic, protecting thus the surface with respect to moisture.

Amongst the phosphonated monomers which can be used within the scope of this invention, mention can be made of:

$CH_2=CR'—CO_2—(CH_2)_n—PO(OR)_2$ n=2 to 12
$CH_2=CR'—CO_2—CH_2—CH_2—S—C_3H_6—PO(OR)_2$

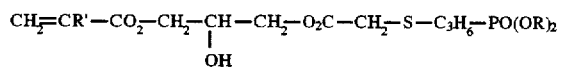

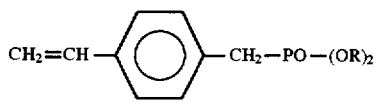

$CH_2=CH—O—CO—CH_2—S—C_3H_6—PO(OR)_2$
$CH_2=CH—CONH—CH_2—C\ (CH_3)_2—PO(OR)_2$
$CH_2=CH—PO(OR)_2$
$CH_2=CH—CH_2—PO(OR)_2$;

with R=H, $SiR"_3$, R" being of the aliphatic or cycloaliphatic alkyl type.

R'=H, $CH_3$.

Use can also be made of salts of these monomers, in the form of $NH_4$ or $NH_3R'''$, with R''' aliphatic or cycloaliphatic alkyl.

According to the invention, these monomers are grafted onto the halogenated skeleton after having activated it. This activation can be achieved by technics involving the use of ozone or electrons or γ-rays.

In case the halogenated polymer or copolymer contains C—H bonds, use can be made of any means, including ozone.

When the halogenated polymer or copolymer does not contain a C—H bond, but only C—F bonds, ozone is generally not suited and use has preferably to be made of an activation by electronic radiations or γ-radiations.

In any case, radicals of the peroxide or hydroperoxide type are formed in the presence of oxygen (gas or air).

Under the effect of the temperature, these radicals decompose and, if there are unsaturated phosphonated monomers in the neighbourhood, they are deactivated onto these latter monomers starting a polymerization reaction. It is especially this technic which permits to obtain halogenated polymers or copolymers grafted with phosphonated chains.

This technic can be applied in different ways depending on the starting product and on the process used for the activation.

Ozonization is advantageously performed either in mass, in a reactor wherein the powdery halogenated polymer or copolymer is maintained in a fluidized bed, or in solution in a solvent.

In case the activation is effected by electron radiations or γ-radiations, this can be performed onto the formed coating or onto the powder which constitutes the product.

According to the invention, the phosphonated chains are grafted in the form of esters of formula $PO(OR')_2$ wherein R' may be a H, $SiR^2_3$, group, $R^2$ being an aliphatic or cycloaliphatic alkyl group, or of their $NH_4$ or $NH_3R"$ salts, wherein R" may be an aliphatic or cycloaliphatic group.

The phosphonated chains may be grafted in the form of alkyl esters and their ester groups may be modified subsequently to obtain one or two siliconized ester groups or ammonium salt groups or acid groups.

If the ester is siliconized, the presence of moisture during the application causes a progressive transition to the acid form, which will ensure its surface protecting function.

If use is made of ammonium salts, ammonia will be set free during the application in a hot state onto a support and the desired phosphonic acid groups will be formed.

Advantageously, the fact of using thermoplastic polymers or copolymers implies that the products can be applied by coating in a hot state, the relatively high temperature permitting to ensure the coalescence and the viscosity will thus be sufficiently low in order that the compounds penetrate into the smallest anfractuosities of the surfaces onto which they are applied.

Moreover, the product according to the invention can be obtained under the following different forms:

in powder of a granulometry going from 0 to 250 μ, in the case of coating in fluidized bed, by coextrusion or, as powdery paint, by electrostatic spraying;

in aqueous solution, after neutralization and after separation of the neutralizing agent, passage through an oven to ensure the coalescence of the coating;

in a solvated solution, in various solvents according to the type of polymer or copolymer.

The invention concerns also the use of these new polymers and copolymers in the formulation of coating products suited to ensure an anti-corrosion protection of metal surfaces, and to give them simultaneously appearance qualities which are as little as possible sensitive to aging and degradation.

These new polymers and copolymers, in addition to the fact that they can be used in paint formulations presented under three different forms, according to the requirements (powder, solvent, hydrodispersion), will have the property of acting with the surfaces to be protected while eliminating the chemical conversion problems of the metals and alloys onto which they will be applied. In this way, it will be possible to reduce the impact onto the environment significantly, even as the costs for maintaining the treatment devices.

Hereinafter are given some examples of embodiments of the product according to the invention.

Without pretending to give examples of paint preparations, the mastery of which is left to the men skilled in the art, the applicant has nevertheless wanted to evaluate the qualities of various new film forming constituents by confining herself to simple preparations, in the composition of which only one single pigment has been used, titanium dioxide, excluding any other deadening pigment, in order to better determine the barrier effect of the film forming system. The produced coatings have been subjected to a series of usually applied tests which are able to establish the efficiency of the treatment.

All the formulations have been effected starting from the pulverulent state of the film forming constituents. This is a state which has obligatory to be passed for liquid formulations because, even if it would be possible to take advantage of any phase of the synthesis of the solvated state of the film forming constituents, this can only be in an organic solvent medium, which would not allow a presentation as hydrodispersion, and which would also not exclude the elimination of the solvent to obtain the film forming constituent in a dry pulverulent form.

EXAMPLE 1

Polyvinylidene fluoride compound grafted with a phosphonated ester acrylate.

50 g of powdery polyvinylidene fluoride are introduced in the column of a double jacket reactor wherein a gaseous air/ozone mixture flows at a flow rate of 1600 l/h, a power of 350 W, at 50° C. for 2 h. Infra-red analysis permits to show the presence of a bond situated at 1720 cm$^{-1}$ corresponding to the carbonyl function of the peroxides and hydroperoxides formed on the polymer.

The recovered powder is introduced into the kneading cell of a Brabender type apparatus, at 200° C., and 30 g of phosphonated acrylate of formula

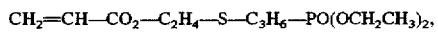

obtained according to the technique set forth by the authors in Polymer Bulletin, 30, 243–248, (1993) are added. After 15 min kneading, a compound is recovered which is washed in acetone to eliminate the residual monomer and the non-grafted homopolymer. The grafted compound is dried and subsequently milled into a powdery form. The final product has a fluor content of 23% and a phosphorus percentage near 4%.

EXAMPLE 2

Polyvinylidene fluoride compound grafted with a phosphonated acrylate in the form of a siliconized ester obtained according to example 1, but the phosphonated monomer is the product synthesized starting from the previous phosphonated ester by reaction with bromo or chloro trimethylsilane, described by the authors in the same publication as the one cited in example 1.

EXAMPLE 3

Polyvinylidene fluoride compound obtained according to example 1, the synthesized product being subsequently modified in the form of a siliconized phosphonic ester according to the same technique as in example 2.

EXAMPLE 4

Polyvinylidene fluoride compound according to example 1, grafted with a phosphonated acid acrylate, the phosphonated monomer being synthesized starting from the siliconized ester of example 2, by hydrolysis in methanol or water, according to the technique described by the authors in the same publication.

EXAMPLE 5

Polyvinylidene fluoride according to example 2, grafted with a phosphonated acrylate in the form of a siliconized ester, the obtained product being subsequently modified according to the technique described by the authors and in the works of B. Hamoui (doctorate USTL, 1991), with a dicyclohexyl type amine to obtain, according to the initial stoichiometry, the mono- or di- salt of the phosphonated acid. This modification permits both to stabilize the compound and the rediscover, during the application in a hot state, the phosphonated acids by release of the ammonium salt.

EXAMPLE 6

Ethylene tetrafluoroethylene copolymer compound according to examples 1 to 5, the grafting reaction being performed at 260° C.

EXAMPLE 7

Ethylene chlorotrifluoroethylene copolymer compound according to examples 1 to 5, the grafting reaction being performed at 200° C.

EXAMPLE 8

Compound according to examples 1 to 5, obtained starting from a copolymer of tetrafluoroethylene and propylene, the grafting reaction being effected at 300° C.

EXAMPLE 9

Compound according to examples 1 to 5, for which the ozonization reaction is performed in dimethylformamide solution.

EXAMPLE 10

Compound according to examples 1 to 5, for which the activation is performed onto (PTFE) polymer powder, under the action of an electron radiation with a dose of 10 kGy.

EXAMPLE 11

Compound according to examples 1 to 5, for which the activation is performed onto a PTFE film, by passing under an electron beam for a dose of 10 kGy.

EXAMPLE 12

Compound according to examples 1 to 5, wherein the phosphonated monomer is the phosphonated styrene described in the thesis of Hamoui and used either in the form of a normal ester, in the form of a siliconized ester or in the acid form.

EXAMPLE 13

Compound according to example 12, wherein after having grafted the phosphonated monomer, this monomer is transformed into the phosphonated ammonium salt by reaction of the acids or the siliconized esters with dicyclohexylamine.

EXAMPLE 14

Compound according to examples 1 to 5, wherein the phosphonated monomer is an acetate described in the works of Hamoui, which can be used in the ester, siliconized ester or acid form.

EXAMPLE 15

Compound according to examples 1 to 5, wherein the phosphonated monomer is of the vinyl type, in the ester, siliconized ester or acid form.

EXAMPLE 16

Compound according to examples 1 to 5, wherein the phosphonated monomer is of the allyl type, in the ester, siliconized ester or acid form.

EXAMPLE 17

Preparation of the film forming copolymers in the state wherein they are to be applied:

there is started from the copolymer defined in example 1 which is taken in the powdery state and formulated according to:

| | |
|---|---|
| Copolymer example 1 | 66 |
| Ethyl acrylate/2-ethyl hexyl acrylate copolymer | 1 |
| TiO₂-Kronos 2160 | 33 |
| | 100 |

The whole is introduced in a double cone type mixer "Gardner mixers and blenders". After mixing, the obtained powder is introduced into a double screw extruder of the type ZSK of "Werner and Pfleiderer", in view of ensuring a perfect homogeneity of the mixture, at a temperature of 175° C. The thermoplastic nature of the binder requires a cryogenic milling of the obtained product with sorting out of the particles and separation of dust by centrifugation ("Turboples ATP of Alpine AG"), retaining only the 8/5 microns fraction.

This method and the same formulation have been maintained for the preparations starting from respectively the copolymers of examples 6 and 7.

subsequently, the following liquid formulations have been prepared:

| | Ex. 1 | Ex. 6 | Ex. 7 |
|---|---|---|---|
| ORGANIC SOLVENT FORMULATIONS | | | |
| COPOLYMER | 50 | 37 | 40 |
| ISOPHORONE | 34 | — | 30 |
| ETHYLGLYCOL ACETATE | 5 | — | — |
| DI-ACETONE ALCOHOL | 4 | — | — |
| PALATINOL M | 6.5 | — | 6 |
| CYASTAT SN | 0.5 | 0.5 | 0.5 |
| METHOXY PROPYL ACETATE | — | 12.5 | 15.5 |
| DI-METHYL PHTHALATE | — | 9.05 | 8 |
| TOLUENE | — | 22.05 | — |
| XYLENE | — | 18.9 | — |
| | 100 | 100 | 100 |
| HYDRODISPERSED FORMULATIONS | | | |
| COPOLYMER | 50 | 45 | 45 |
| D1-METHYL AMINO ETHANOL | 1 | 1 | 1 |
| N-METHYL PYRROLIDINE | 5 | 12 | 12 |
| D1-PROPYLENE GLYCOL | 9 | 7 | 7 |
| RHOPLEX B 88b | 20 | 18 | 18 |
| DEMINERALIZED WATER | 15 | 17 | 17 |
| | 100 | 100 | 100 |

The aggressive agent behaviour tests, even as the physical and mechanical characteristics, related to the coatings obtained starting from powdery formulations because in all of the other presentation types, the film forming constituents were the same.

The value of the pigment/resin ratio has been set arbitrarily to 0.5.

The products have been applied onto three surface types:
steel
double side galvanized steel 300 g/m²
aluminium
by electrostatic atomization.

In case of liquid preparations, the viscosity of the preparations has been brought to the value of 50 seconds for the aqueous dispersions and to 90 seconds for the solvates, in a FORD No.4 cut.

The treated surfaces have been degreased and/or pickled previously if necessary.

The coating thicknesses were comprised between 25 and 30 microns in the case of the application of powders. The coatings were subjected to a heat treatment at temperatures comprised between 220° and 250° C. for 20 minutes.

| RESULTS | Ex. 1 | Ex. 6 | Ex. 7 |
|---|---|---|---|
| 1) On steel | | | |
| ASTM D3363 Harness (1) | H | F | F |
| MEK Resistance (2) | >100 | >100 | >100 |
| ASTM D2794 Impact (3) | O.K. | O.K. | O.K. |
| QUV Residual brightness (4) | | | |
| ASTM G53-77/3000H | 96% | 88% | 85% |
| BS ECCA/T8/hours (5) | >800 | >800 | >800 |
| NFT 30038 Adherence (6) | 100% | 100% | 100% |
| Blistering (7) | G | MD8 | MD6 |
| 2) On galvanized steel | | | |
| ASTM D3363 Hardness (1) | H | F | F |
| MEK Resistance (2) | >100 | >100 | >100 |
| ASTM D2794 Impact (3) | O.K. | O.K. | O.K. |
| QUV Residual brightness (4) | | | |
| ASTM G53-77/3000H | 97% | 89% | 83% |
| BS ECCA/T8 (5) | >1000 H | >1000 H | >1000 H |
| NFT 30038 Adherence (6) | 100% | 100% | 100% |
| Blistering (7) | G | MD8 | MD6 |
| 3) On aluminum | | | |
| ASTM D3363 Hardness (1) | H | F | F |
| MEK Resistence (2) | >100 | >100 | >100 |
| ASTM D2794 Impact (3) | O.K. | O.K. | O.K. |
| QUV Residual brightness (4) | | | |
| ASTM G53-77/3000H | 97% | 89% | 87% |
| BS ECCA/T8/hours (5) | >3000 | >2000 | >2000 |
| NFT 30038 Adherence (6) | 100% | 100% | 100% |
| Blistering (7) | G | MD8 | MD8 |

Explanations and information concerning the terms used in the table (1) ASTM D 3363 Hardness This is expressed by means of pencils with a variable hardness increasing in the range of 6B to 9H.

The hardness corresponds with the one of the pencil which is the first one to leave no trace onto the applied film.

(2) MEK Resistance

It corresponds to the number of passages, back and forth, of a pad impregnated with MEK without causing degradation or soaking of the coating, which permits to determine the reached cross-linking degree.

A number of 100 passages is considered as satisfying.

(3) ASTM Impact

This is a question of measuring the impact resistance of a coating (Cf. AFNOR 30.039). This impact is caused by a free vertical fall of a steel mass having a polished spherical extremity of a 23 mm diameter, and a weight of 400 or 1000 g, from a predetermined height and which does not produce any crackling or partial loosening of the coating.

(4) QUV Residual Brightness

The object is to establish, after exposure to UV-radiation of a defined wave length from a xenon lamp and this for rather long periods (in general of some thousands hours), the brightness loss expressed by the residual brightness with respect to the initial brightness, which measurement is done by means of a glossmeter.

(5) BS ECCA

Exposure time to a 5 % NaCl solution at 350° C. before appearance of a corrosion of the basic support and the penetration thereof, in the area of the scarified part, down to the metal.

(6) Adherence

In practice, a number of incisions (6 to 11) is made spaced apart (from 1 to 2 mm) onto the paint coating under a uniform pressure at the speed of 20 to 50 m/sec, followed by parallel identically spaced incisions which are perpendicular to the first tracing and this in order to form a grid on the coating, the incisions being made until they reach the metal.

Subsequently, the tearing test is carried out by using an adhesive strip, which shows an adhesiveness comprised between 6 and 7 N/cm, applied onto the grid.

The results are expressed according to a classification from 0 to 5 and by comparison with a standard cliche.

(7) Blistering (Cf. AFNOR T.30-071) This is a question of evaluating the "blistering", by humid corrosion, produced in cathodic zones according to the reaction
$2H_2O + O_2 + 4e^- \rightarrow 4OH^-$ which causes an initial hydrolysis of the coating.

The evaluation of the default takes account of both the size of the "blisters" and of their number onto a determined surface, with a value scale corresponding to reference cliches.

It results from the above-mentioned statement that the product according to the invention is substantially different from the product described in the abstract of Chemical Abstracts or of said European patent 0175035 by the fact that it contains fluorinated compounds instead of polyvinyl chloride. Furthermore, the compound is thermally grafted and it is generally a monofunctional phosphonate grafted on polymer and not a phosphate.

On the other hand, the product according to the invention is useful as a conventional and curable paint by evaporation of solvent.

In the products described in both these prior publications, there are thus phosphates which posses more than a double bond, so that they are unusable for grafting which is essential for the product of the invention.

Another important difference is that said known products contain hydrolysable phosphates while in the product of the invention they are phosphonates stable to hydrolysis.

Thus, the advantages of the product of the invention with reference to the above-known products are i.a. as follows:

it is a finished polymer, chemically not cross-linkable, which is deposited as a powder or a solution and which neither requires cross-linkage nor chemical reaction between various reactants;

if it is a powder, it is sufficient to apply it with heat on a substrate; if it is a solution, it is sufficient to evaporate the solvent. In both cases, the polymer has a molecular weight high enough and chemical resistance properties to provide a paint such as for example the PDF paints, which is in fact a polymer used as a backbone;

the product according to the invention, thanks to its components, is naturally resistant to solvents, to U.V. and is a barrier to humidity. This is not the case for PVC which resists badly to ageing;

these are phosphonates and not phosphates which are grafted, which is very different since phosphates resist badly to humidity and hydrolyse themselves;

the product according to the invention has anti-corrosion properties by producing a conversion coating with metal and not only adherence; the whole barrier coating/grafting of acid phosphonic groups/reaction of P—OH with metal, is remarkable for an anti-corrosion application.

What is claimed is:

1. A process for preparing a product for forming a coating on a support comprising at least one of a halogenated polymer and a halogenated copolymer, activated by at least one of a reactive peroxide function, hydroperoxide function, or both a peroxide function and a hydroperoxide function, wherein at least one said reactive function is created onto said halogenated polymer and/or copolymer and wherein at least one phosphonated chain is grafted onto the thus activated polymer and/or copolymer.

2. The process as claimed in claim 1, wherein the phosphonated chain is a phosphonic acid chain.

3. The process as claimed in claim 1, wherein said reactive function is created onto said halogenated polymer and/or copolymer by electron radiation, X-radiation or γ-radiation.

4. The process as claimed in claim 1, wherein in case the polymer and/or copolymer contains at least one CH-bond, said reactive function is created onto this polymer and/or copolymer by an ozone treatment either in mass or in solution.

5. The process as claimed in claim 1, wherein said phosphonated chain is formed by grafting an ester of formula $PO(OR')_2$, wherein R' is hydrogen or a $SiR''_3$ group, R" being a $(C_1-C_8)$ aliphatic or $(C_3-C_8)$ alicyclic alkyl group, or $NH_4$ or $NH_3R'''$ ammonium salts thereof, wherein R''' may be a $(C_1-C_8)$ aliphatic or $(C_3-C_8)$ alicyclic alkyl group.

6. The process as claimed in claim 1, wherein said phosphonated chain is formed onto said polymer and/or copolymer starting from an acrylate of a phosphonated ester, in particular an acrylate whose ester group is of the siliconized alkyl type and which is attached by grafting onto said polymer and/or copolymer.

7. The process as claimed in claim 1, wherein use is made of at least one of the phosphonated monomers chosen within the following group for being grafted onto said polymer and/or copolymer:

$CH_2=CR'—CO_2—(CH_2)_n—PO(OR)_2$  n=2 to 12
$CH_2=CR'—CO_2—CH_2—CH_2—S—C_3H_6—PO(OR)_2$

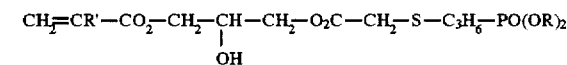

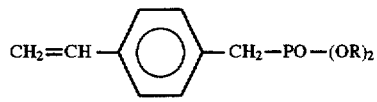

$CH_2=CH—O—CO—CH_2—S—C_3H_6—PO(OR)_2$
$CH_2=CH—CONH—CH_2—C(CH_3)_2—PO(OR)_2$
$CH_2=CH—PO(OR)_2$
$CH_2=CH—CH_2—PO(OR)_2$;

in these formulae R is hydrogen or a $SiR''_3$ radical, R" being of the $(C_1-C_5)$ aliphatic or $(C_3-C_8)$ alicyclic alkyl type; R' is hydrogen or a methyl group; as well as ammonium salts of these monomers which may be substituted or not.

8. The process as claimed in claim 5, wherein after the grafting step, said ester group is transformed into phosphonated acid.

9. The process as claimed in claim 5, wherein in case the phosphonated chain is an ammonium salt, ammonia is set free by heating to form the corresponding phosphonic acid.

10. The process as claimed in claim 5, wherein the phosphonated ester group is attached to a styrene ring, a vinyl group and/or to an allyl function.

11. The process as claimed in claim 10, wherein after the grafting step, the phosphonated ester is transformed into phosphonated acid.

12. The process as claimed in claim 6, wherein after the grafting step, said ester group is transformed into phosphonated acid.

13. The process as claimed in claim 6, wherein in case the phosphonated chain is an ammonium salt, ammonia is set free by heating to form the corresponding phosphonic acid.

14. The process as claimed in claim 6, wherein the phosphonated ester group is attached to a styrene ring, a vinyl group and/or to an allyl function.

15. The process as claimed in claim 9, wherein after the grafting step, said ester group is transformed into phosphonated acid.

16. The process as claimed in claim 7, wherein in case the phosphonated chain is an ammonia salt, ammonia is set free by heating to form the corresponding phosphonic acid.

17. A process according to claim 1 wherein said phosphonated chain is a phosphonated monomer.

* * * * *